US012702131B2

(12) United States Patent
Bartia

(10) Patent No.: US 12,702,131 B2
(45) Date of Patent: Aug. 11, 2026

(54) SYNERGISTIC AGROCHEMICAL COMBINATION

(71) Applicant: UPL LIMITED, Mumbai (IN)

(72) Inventor: Amiya Kumar Bartia, Mumbai (IN)

(73) Assignee: UPL LIMITED, Mumbai (IN)

( * ) Notice: Subject to any disclaimer, the term of this patent is extended or adjusted under 35 U.S.C. 154(b) by 875 days.

(21) Appl. No.: 17/796,276

(22) PCT Filed: Jan. 28, 2021

(86) PCT No.: PCT/IB2021/050647
§ 371 (c)(1),
(2) Date: Jul. 29, 2022

(87) PCT Pub. No.: WO2021/152485
PCT Pub. Date: Aug. 5, 2021

(65) Prior Publication Data

US 2023/0082089 A1 Mar. 16, 2023

(30) Foreign Application Priority Data

Jan. 31, 2020 (IN) ............................ 202021004452

(51) Int. Cl.

| | |
|---|---|
| ***A01N 31/02*** | (2006.01) |
| ***A01N 37/34*** | (2006.01) |
| ***A01N 43/36*** | (2006.01) |
| ***A01N 47/14*** | (2006.01) |
| ***A01N 47/22*** | (2006.01) |
| ***A01N 57/20*** | (2006.01) |
| ***A01P 3/00*** | (2006.01) |
| ***A01P 13/02*** | (2006.01) |

(52) U.S. Cl.
CPC ............. *A01N 31/02* (2013.01); *A01N 37/34* (2013.01); *A01N 43/36* (2013.01); *A01N 47/14* (2013.01); *A01N 47/22* (2013.01); *A01N 57/20* (2013.01); *A01P 3/00* (2021.08); *A01P 13/02* (2021.08)

(58) Field of Classification Search
CPC ..................................................... A01N 31/02
See application file for complete search history.

(56) References Cited

U.S. PATENT DOCUMENTS

| | | | | |
|---|---|---|---|---|
| 4,470,840 A * | 9/1984 | Welebir | ................. | A01N 31/02 504/125 |
| 2016/0120177 A1* | 5/2016 | Shroff | .................... | A01N 25/30 504/207 |

FOREIGN PATENT DOCUMENTS

| | | |
|---|---|---|
| CN | 107568220 A | 1/2018 |
| CN | 110663493 | 1/2020 |
| WO | WO 2017/166563 A1 | 10/2017 |

OTHER PUBLICATIONS

Search Strategy dated Apr. 16, 2021 in the file history of the corresponding international application.
International Search Report dated Apr. 16, 2021.
Written Opinion of the International Searching Authority dated Apr. 16, 2021.
Kremer, R.J. et al., 2017. S065 (P132) The Multi-Functional Brassinosteriod . . . Glyphosate Herbicide Stress. The Abst. Book for Oral and Poster . . . in Agriculture. p. 136-137.
Organic Farming, 2016. The Science behind Vitazyme—summary of independent research on multiple active ingredients. Google search results.
Naeem, M. et al., 2012. Triacontanol: A potent plant growth regulator in agriculture. Journal of Plant Interactions. vol. 7, pp. 129-142.

* cited by examiner

*Primary Examiner* — Gina C Justice
(74) *Attorney, Agent, or Firm* — CANTOR COLBURN LLP

(57) ABSTRACT

The present invention relates to a novel and synergistic agrochemical combination. The present invention provides agrochemical combination comprising a synergist and an herbicide or a fungicide and compositions thereof especially for controlling weeds and fungi.

8 Claims, 3 Drawing Sheets

Treatment Photographs at 25 DA-A
Fig 1 : Untreated check

Fig 2 : Glufosinate @ 3000 ml/ha

Fig 3 : Glufosinate + Triacontanol @ 3000+500 ml/ha

SYNERGISTIC AGROCHEMICAL COMBINATION

RELATED APPLICATIONS

This patent application is a U.S. National Stage Application of International Patent Application Number PCT/IB2021/050647, which was filed on Jan. 28, 2021, which claims the benefit of priority of Indian patent Application number IN 202021004452, filed on Jan. 31, 2020, which is incorporated herein by reference in its entirety.

FIELD OF THE INVENTION

The present invention relates to a novel and synergistic agrochemical combination. The present invention provides agrochemical combination comprising a synergist and an herbicide or a fungicide and compositions thereof especially for controlling weeds and fungi.

BACKGROUND AND PRIOR ART

Herbicides are phytotoxic chemicals used for destroying unwanted plants, such as weeds or inhibiting their growth. Herbicides are classified based upon different aspects such as mode of action, site of action, chemical families, time of application, selectivity, translocation, etc. Based upon the time of application, herbicides are classified as preemergence and postemergence. Preemergence herbicides are applied before the weed seedlings emerge through the soil surface. Post emergence herbicides are applied after weed seedlings have emerged through the soil surface.

Post emergence herbicides vary in their mobility within the plant. Some demonstrate very limited movement following absorption and are commonly referred to as "contact" herbicides. Others can move extensively within the vascular elements of the plant and are referred to as "systemic" herbicides. Fungicides also have a similar classification into contact and systemic fungicides. Contact herbicides show some limited movement following absorption, but not nearly as extensively as systemic herbicides. Various features of herbicides e.g., absorption, metabolism, translocation, detoxification and site of action are important for any herbicide to be active and effective on target weed. For a successful weed elimination and control strategy to be effective, all of the above conditions must be met.

More physiologically active the weeds are more susceptible they are to the herbicides. Normally during application time, target weeds may or may not be physiologically active at required rate, this limits the performance of the herbicides.

Glufosinate, a Glutamine Synthase inhibitor is a weak acid and non-volatile molecule, principally taken by the exposed vegetative parts e.g. foliage and least activity through soil. Although it is highly soluble in water, its translocation is limited because the rapid activity of the herbicide quickly disrupts photosynthesis and cell integrity. This herbicide effectively limits own translocation. So this molecule can be made more effective if it is made to be absorbed by plants more actively and also work faster on photosynthesis activity of the plants. In fact, as Glufosinate is highly water soluble, it can be washed from leaves by rains up to four hours following application. This suggest that if the target weeds are in more active stage when Glufosinate is applied on them, it can absorb this chemistry better and work better as the physiological condition of weed is congenial. This applies to herbicides in general to show more efficacy when an herbicide is applied during the active physiology of the weeds.

Acetyl-CoA carboxylase (ACCase) inhibitors are primarily used for postemergence grass control in broadleaf crops. ACCase inhibitor known as the "fops" and "dims" e.g. Clethodim affect grasses but not broad leaves crops or weeds. They are poorly water soluble and are weak acids, their poor water solubility limits phloem mobility. They are only active as a foliar spray and are not taken up from soil solution. Unlike Glufosinate, which has chance of being washed off as highly water soluble, the dims degrade rapidly in sunlight. These herbicides are exposed to sunlight when on the surface of the leaf. That's the reason faster absorption of the dims also become important, as they also have chance to degrade before entering the leaf and activity will be lost. The dims inhibit ACCase of grass plants, slowing down and stopping photosynthesis activity. ACCase is located primarily in chloroplasts and is active in young and growing meristematic tissues. When seedlings are growing quickly, there is a great demand for membrane building material, it is during rapid growth that ACCase is most active and therefore, also when the inhibitors are more active and effective. When growth is slowed by stress or plants are more dormant or less responsive the inhibitors are less active.

Fungi are the number one cause of crop loss worldwide. Fungicides refer to a substance that kill or inhibit the growth of a fungus that is pathogenic to plants or crops.

Triacontanol is a unique plant growth promoter that helps in increasing the yield of crops. Triacontanol is used as an effective foliar spray. It is formulated as an Emulsifiable Concentrate and also Water Dispersible Granular (WDG) formulation.

There is therefore, a need in the art, for an agrochemical combination that aids in complete killing of weeds and fungi, with enhanced efficacy at reduced application rate.

Embodiment of the present invention may therefore ameliorate one or more of the above mentioned problems.

ONE OR MORE OBJECTS OF THE INVENTION

Therefore, one object of the present invention is to provide a synergistic combination for weeds or fungi control.

Another object of the present invention is to provide an efficacious method of controlling weeds and fungi by application of a synergistic combination.

Another object of the present invention is to provide a composition comprising a synergistic combination.

Yet another object of the present invention is to provide a method of increasing yield in a crop by application of a synergistic combination.

Another object of the present invention is to provide a method of improving the plant health by application of a synergistic combination.

Another object of the present invention is to provide a synergistic combination which offers a broader and more complete spectrum of weed or fungi control.

Another object of the present invention is to provide a synergistic combination which provides a better control of weeds or fungi at lower dosage.

Some or all these and other objects of the invention can be achieved by way of the invention described hereinafter.

SUMMARY OF THE INVENTION

Therefore, in one aspect, the present invention may provide a combination comprising:

a) triacontanol or its derivatives; and b) an herbicide or a fungicide.

In another aspect, the present invention may provide a composition comprising:

a) triacontanol or its derivatives;

b) an herbicide or a fungicide; and c) at least one agrochemically acceptable excipient.

Yet another aspect of the present invention may provide a method of controlling weeds or fungi, said method comprising applying to the locus a combination comprising:

a) triacontanol or its derivatives; and b) an herbicide or a fungicide.

Yet another object of the present invention may provide a method of increasing yield in a crop by application of a combination comprising:

a) triacontanol or its derivatives; and b) an herbicide or a fungicide.

BRIEF DESCRIPTION OF THE ACCOMPANYING DRAWINGS

FIG. 1 shows untreated field.

FIG. 2 shows field treated with Glufosinate @ 3000 ml/ha.

FIG. 3 shows field treated with Glufosinate @ 3000 ml/ha+Triacontanol @ 500 ml/ha.

DETAILED DESCRIPTION

The term herbicide, as used herein, shall mean an active ingredient that kills, controls or otherwise adversely modifies the growth of plants by killing the weeds. As used herein, an agrochemically effective amount is an amount of active ingredient that causes a "herbicidal effect or fungicidal effect" i.e., an adversely modifying effect and includes deviations from natural development, killing, regulation, desiccation, or retardation. The terms "plants" include, but are not limited to, germinant seeds, emerging seedlings, plants emerging from vegetative propagules, and established vegetation. The term "locus" as used herein shall denote the vicinity of a desired crop in which weed control, typically selective weed control is desired. The locus includes the vicinity of desired crop plants wherein the weed infestation has either emerged or is yet to emerge. The term crop shall include a multitude of desired crop plants or an individual crop plant growing at a locus. The term fungicide, as used herein, shall mean an active ingredient that kills, controls or otherwise adversely modifies the growth of plants by inhibiting or killing fungi and thereby free the plants from fungal infestation.

The contact herbicides e.g., Glufosinate requires ready absorption at the leaves as they as they are prone to be washed off being highly soluble and they act the best when the target weeds are active with its photosynthesis and respiration activities. During the application, it sometimes happens the environmental conditions are not so favorable and weeds are also not physiologically active e.g., during rainy/cloudy days. Sometimes weeds themselves are also slow with its physiology due to less or poor moisture conditions. Typically in these cases when targeted weeds are exposed to the herbicides, the performance of the chemistry get compromised because osnf lesser acceptance, absorption of chemicals through leaves. In these cases, farmers tend to overdose, repeat spray so that to have proper kill. This situation can be improved by elevating the physiological order of the target weeds.

It has now been found that Triacontanol excites the target weeds, elevates the physiological order of the target weeds. It is further found that when these target weeds are exposed to herbicides; the herbicides kill the target weeds much more synergistically with other herbicides.

It has been found that triacontanol synergizes the fungicidal efficacy of fungicides as well.

The present inventors have surprisingly found that triacontanol when combined with herbicides or fungicides improved the physiological condition of the target weeds or fungal infested plant and catalyzed the weeds or fungal infested plant's behavior of absorbing herbicides or fungicides better resulting further penetration and absorption of herbicides or fungicides in the target weeds or plants respectively and eventually leading to successful and complete elimination of weeds or fungi.

It was surprisingly found that even a minor amount of triacontanol, resulted in unexpectedly enhancing the efficacy of the herbicide or fungicide than expectable in controlling undesired weeds in the field or fungi in the plants. Therefore, it was surprising that triacontanol acted as a synergist for herbicides and fungicides, which was hitherto unknown.

Surprisingly, it has been found that the combinations and compositions according to the present invention do not only exhibit a super-additive effect of the activity of the individual component but exert a synergistic effect when used in combination. Therefore, firstly, the customary application rates of the individual substances were reduced.

The performance of the herbicides or fungicides largely depend on the activity stage or physiological health of the weeds or fungal infested plants. The herbicides or fungicides can kill more when the target weeds or fungal infested plants are super active. There is therefore a need in the art to make the targeted weeds or fungal infested plants more responsive to herbicides or fungicides when they are in action.

The present invention therefore aims to solve the above problem by elevating the physiological health of the target weeds or fungal infested plants by combining the herbicide or fungicide with Triacontanol. The combination changes the status quo of the weeds or fungal infested plants at time of application by making it more susceptible to the herbicide or fungicide rather than waiting for the congenial condition and also overcomes the worry of missing the important timeline such as leaf stage of target weeds.

Thus, an aspect of the present invention relates to a combination comprising triacontanol or its derivatives and an herbicide or a fungicide. The combination of the herbicides or fungicides with triacontanol leads to an enhancement in the efficacy of the herbicide or fungicide in killing the weeds or fungal infestation completely.

Therefore, in one aspect, the present invention provides a combination comprising:

a) triacontanol or its derivatives; and b) an herbicide or a fungicide.

In an aspect, the present invention provides a method of controlling weeds or fungal infestation at a locus by applying, to the locus, a combination of the present invention.

Thus, in this aspect, the present invention provides a method of controlling weeds or fungal infestation at a locus, the method comprising applying, to the locus, a combination comprising:

a) triacontanol or its derivatives; and b) an herbicide or a fungicide.

In an aspect, the present invention provides a composition comprising the combination of the present invention along with at least one agrochemically acceptable excipient.

Thus, in this aspect, the present invention provides a composition comprising:

c) triacontanol or its derivatives;

d) an herbicide or a fungicide; and e) at least one agrochemically acceptable excipient.

In an aspect, the present invention provides a method for increasing yield in a crop by using the combinations of the present invention. Therefore, in this aspect, the present invention provides a method of increasing yield in a crop by application of a combination or composition comprising:

a) triacontanol or its derivatives; and b) an herbicide or a fungicide.

In an aspect, the present invention provides a method of improving the plant health using the combinations of the present invention. Therefore, in this aspect, the present invention provides a method of improving the plant health, said method comprising application at the locus of the plant, a combination comprising:

a) triacontanol or its derivatives; and b) an herbicide or a fungicide.

Each of the aspect described above may have one or more embodiments.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the herbicide includes a contact or a systemic herbicide.

In an embodiment, the choice of the specific herbicide or the specific fungicide is not limiting as triacontanol was found to surprisingly synergize all the tested herbicides or fungicides generally. The embodiments described hereinafter relate to the preferred embodiments of these herbicides and fungicides, which are not to be construed as being limiting.

In an embodiment, the contact or systemic herbicide is selected from the group consisting of organophosphorus herbicide, aryloxyphenoxypropionic herbicide, cyclohexene oxime herbicide and carbamate herbicide.

In an embodiment the organophosphorus herbicide is selected from the group consisting of amiprofos-methyl, amiprophos, anilofos, bensulide, bilanafos, butamifos, clacyfos, tris[2-(2,4-dichlorophenoxy)ethyl] phosphite (2,4-DEP), [O-(2,4-dichlorophenyl) O-methyl N-propan-2-ylphosphoramidothioate] (DMPA), ethyl bis(2-ethylhexyl) phosphinate (EBEP), fosamine, glufosinate, L-glufosinate, glufosinate-P, glyphosate, huangcaoling, piperophos and shuangjiaancaolin.

In an embodiment the carbamate herbicide is selected from the group consisting of asulam, carboxazole, chlorprocarb, dichlormate, fenasulam, karbutilate and terbucarb.

In an embodiment the aryloxyphenoxypropionic herbicide is selected from the group consisting of chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, kuicaoxi, metamifop, propaquizafop, quizalofop, quizalofop-P and trifop.

In an embodiment the cyclohexene oxime herbicides is selected from the group consisting of alloxydim, butroxydim, clethodim, cloproxydim, cycloxydim, profoxydim, sethoxydim, tepraloxydim and tralkoxydim.

In an embodiment, the preferred herbicide is glufosinate.

In an embodiment, the preferred herbicide is L-glufosinate.

Thus, in a preferred embodiment, the present invention provides a combination comprising:

a) triacontanol or its derivatives; and b) glufosinate.

Thus, in a preferred embodiment, the present invention provides a combination comprising:

a) triacontanol or its derivatives; and b) L-glufosinate.

In an embodiment, the preferred herbicide is glyphosate.

In another embodiment, the preferred herbicide is clethodim.

Thus, in another preferred embodiment, the present invention provides a combination comprising:

a) triacontanol or its derivatives; and b) clethodim.

In an embodiment, the fungicide includes a multi-site fungicide.

In an embodiment, the multi-site fungicide is selected from the group consisting of dithiocarbamates, phthalimides, chloronitriles, inorganic fungicides, sulfamides, bisguanidines, triazines, quinones, quinoxalines, maleimides/dicarboxamides and thiocarbamates.

In an embodiment, the multi-site fungicide is a dithiocarbamate fungicide selected from asamobam, asomate, azithiram, carbamorph, cufraneb, cuprobam, disulfiram, ferbam, metam, metiram, nabam, tecoram, thiram, urbacide, ziram, dazomet, etem, milneb, mancopper, mancozeb, maneb, metiram, polycarbamate, zinc thiazole, propineb and zineb.

In an embodiment, the multi-site fungicide is a phthalimide fungicide selected from captan, captafol and folpet.

In an embodiment, the multi-site fungicide is a chloronitrile fungicide such as chlorothalonil.

In an embodiment, the multi-site fungicide is a sulfamide fungicide selected from dichlofluanid and tolylfluanid.

In an embodiment, the multi-site fungicide is a bisguanidine fungicide selected from guazatine and iminoctadine.

In an embodiment, the multi-site fungicide is a triazine fungicide selected from anilazine.

In an embodiment, the multi-site fungicide is a quinone fungicide selected from dithianon.

In an embodiment, the multi-site fungicide is a quinoxaline fungicide selected from chinomethionat/quinomethionate and chlorquinox.

In an embodiment, the multi-site fungicide is a maleimide/dicarboxamide fungicide selected from fluoroimide.

In an embodiment, the multi-site fungicide is a thiocarbamate fungicide selected from methasulfocarb.

In an embodiment, the multi-site fungicide is an inorganic fungicide selected from copper fungicides including copper (II) hydroxide, copper oxychloride, copper (II) sulfate, basic copper sulfate, Bordeaux mixture, copper salicylate $C_7H_4O_3$*Cu, cuprous oxide $CU_2O$; or sulphur.

In an embodiment, the preferred fungicide is mancozeb.

Thus, in a preferred embodiment, the present invention provides a combination comprising:

a) triacontanol or its derivatives; and b) mancozeb.

In an embodiment, the amount of triacontanol in the combination may typically be in the range of 100 PPM to 1000 PPM, preferably 200 PPM to 400 PPM.

In an embodiment, the amount of herbicide in the combination may typically be in the range of 100 g a.i./Ha to 2000 g a.i./Ha, preferably 300 g a.i./Ha to 700 g a.i./Ha.

In an embodiment, amount of fungicide in the combination may typically be in the range of 500 g a.i./Ha to 3000 g a.i./Ha, preferably 1000 g a.i./Ha to 2000 g a.i./Ha.

In an embodiment, the constituent active ingredients of the combination of the present invention may be admixed in the ratio of (1 to 10):(1000 to 10000) of triacontanol and an herbicide respectively.

In an embodiment, the constituent active ingredients of the combination of the present invention may be admixed in ratio of (1 to 10):(1000 to 20000) of triacontanol and a fungicide respectively.

In an embodiment, the present invention provides a combination comprising (a) triacontanol or its derivatives; and (b) an herbicide selected from glyphosate, glufosinate, L-glufosinate or clethodim.

In an embodiment, the combinations of the present invention comprise a plant growth regulator which is other than triacontanol.

In an embodiment, the said plant growth regulator is selected from the group consisting of octacosanol, gibberellic acid, or combinations thereof.

In an embodiment, the present invention provides a combination comprising (a) triacontanol; (b) an herbicide selected from glyphosate, glufosinate, L-glufosinate or clethodim; and (c) octacosanol.

In an embodiment, the present invention provides a combination comprising (a) triacontanol; (b) an herbicide selected from glyphosate, glufosinate, L-glufosinate or clethodim; and (c) gibberellic acid.

In an embodiment, the present invention provides a combination comprising (a) triacontanol; (b) an herbicide selected from glyphosate, glufosinate, L-glufosinate or clethodim; (c) octacosanol; and (d) gibberellic acid.

In an embodiment, the composition of the present invention may contain agriculturally acceptable excipient/adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions or ZC formulations. They can also be provided as a pre-mix or tank mixes.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphate alcohol ethoxylate; natural primary alcohol ($C_{12}$-$C_{16}$) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalenesulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl 30 succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

The target weeds are selected from:—

Urticaceae weeds: *Urtica urens*

Polygonaceae weeds: *Polygonum convolvulus, Polygonum lapathifolium, Polygonum pensylvanicum, Polygonum persicaria, Polygonum longisetum, Polygonum aviculare, Polygonum arenastrum, Polygonum cuspidatum, Rumex japonicus, Rumex crispus, Rumex obtusifolius, Rumex acetosa*; Portulacaceae weeds: *Portulaca oleracea*; Caryophyllaceae weeds: *Stellaria media, Cerastium holosteoides, Cerastium glomeratum, Spergula arvensis, Silene gallica.*

Molluginaceae weeds: *Mollugo verticillata*; Chenopodiaceae weeds: *Chenopodium album, Chenopodium ambrosioides, Kochia scoparia, Salsola kali, Atriplex* spp.; Amaranthaceae weeds: *Amaranthus retroflexus, Amaranthus viridis, Amaranthus lividus, Amaranthus spinosus, Amaranthus hybridus, Amaranthus palmeri, Amaranthus rudis, Amaranthus patulus, Amaranthus tuberculatos, Amaranthus blitoides, Amaranthus deflexus, Amaranthus quitensis, Alternanthera philoxeroides, Alternanthera sessilis, Alternanthera tenella*; Papaveraceae weeds: *Papaver rhoeas, Argemone Mexicana*; Brassicaceae weeds:

*Raphanus raphanistrum, Raphanus sativus, Sinapis arvensis, Capsella* bursa *pastoris, Brassica juncea, Brassica campestris, Descurainia pinnata, Rorippa islandica, Rorippa sylvestris, Thlaspi arvense, Myagrum rugosum, Lepidium virginicum, Coronopus didymus; Dinebra weeds: Dinebra Americana, Dinebra aquatic, Dinebra aristidoides, Dinebra bromoides, Dinebra calycina, Dinebra caudata, Dinebra chinensis, Dinebra chloride, Dinebra chondrosioides, Dinebra coerulescens, Dinebra cristata, Dinebra curtipendula, Dinebra decipiens, Dinebra divaricate, Dinebra divaricatissima, Dinebra dura, Dinebra guineensis, Dinebra hirsute, Dinebra hirta, Dinebra juncifolia, Dinebra ligulata, Dinebra lima, Dinebra melicoides, Dinebra nealleyi, Dinebra neesii, Dinebra panicea, Dinebra panicoides, Dinebra pubescens, Dinebra repens, Dinebra scabra, Dinebra secunda, Dinebra simoniana, Dinebra southwoodii, Dinebra squarrosa, Dinebra srilankensis, Dinebra tuaensis,*

*Dinebra verticillate, Dinebra retroflexa. Dinebra haareri, Dinebra marquisensis, Dinebra perrieri, Dinebra polycarpha, Dinebra somalensis, Capparaceae weeds: Cleome affinis*; Fabaceae weeds: *Aeschynomene indica, Aeschynomene rudis, Sesbania exaltata, Cassia obtusifolia, Cassia occidentalis, Desmodium tortuosum, Desmodium adscendens, Trifolium repens, Pueraria lobata, Vicia angustifolia, Indigofera hirsuta, Indigofera truxillensis, Vigna sinensis*; Oxalidaceae weeds: *Oxalis corniculata, Oxalis strica, Oxalis oxyptera; Geraniaceae weeds: Geranium carolinense, Erodium cicutarium*; Euphorbiaceae weeds: *Euphorbia helioscopia, Euphorbia maculate, Euphorbia humistrata, Euphorbia esula, Euphorbia heterophylla, Euphorbia brasiliensis, Acalypha australis, Croton glandulosus, Croton lobatus, Phyllanthus corcovadensis, Ricinus communis*; Malvaceae weeds: *Corchorus, Abutilon theophrasti, Sida rhombiforia, Sida cordifolia, Sida spinosa, Sida glaziovii, Sida santaremnensis, Hibiscus trionum, Anoda cristata, Malvastrum coromandelianum.*

Sterculiaceae weeds: *Waltheria indica*; Violaceae weeds: *Viola arvensis, Viola tricolor*; Cucurbitaceae weeds: *Sicyos angulatus, Echinocystis lobata, Momordica charantia*; Lythraceae weeds: *Lythrum salicaria*; Apiaceae weeds: *Hydrocotyle sibthorpioides*; Sapindaceae weeds: *Cardiospermum halicacabum*; Primulaceae weeds: *Anagallis arvensis*; Asclepiadaceae weeds: *Asclepias syriaca, Ampelamus albidus*; Rubiaceae weeds: *Galium aparine, Galium spurium* var. *echinospermon, Spermacoce latifolia, Richardia brasiliensis, Borreria alata*; Convolvulaceae weeds: *Ipomoea alba, Ipomoea nil, Ipomoea hederacea, Ipomoea purpurea, Ipomoea hederacea* var. *integriuscula, Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides, Jacquemontia tamnifolia*; Boraginaceae weeds: *Myosotis arvensis*; Lamiaceae weeds: *Lamium purpureum, Lamium amplexicaule, Leonotis nepetaefolia, Hyptis suaveolens, Hyptis lophanta, Leonurus sibiricus, Stachys arvensis*; Solanaceae weeds: *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata, Nicandra physaloides*; Scrophulariaceae weeds: *Veronica hederaefolia, Veronica persica, Veronica arvensis; Plantaginaceae weeds: Plantago asiatica*; Asteraceae weeds: *Xanthium pensylvanicum, Xanthium occidentale, Helianthus annuus, Matricaria chamomilla, Matricaria perforata, Chrysanthemum segetum, Matricaria matricarioides, Artemisia princeps, Artemisia vulgaris, Artemisia verlotorum, solidago altissima, Taraxacum officinale, Galinsoga ciliata, Galinsoga parviflora, Senecio vulgaris, Senecio brasiliensis, Senecio grisebachii, Conyza bonariensis, Conyza canadensis, Ambrosia artemisiaefolia, Ambrosia trifida, Bidens pilosa, Bidens frondosa, Bidens subalternans, Cirsium arvense, Cirsium vulgare, Silybum marianum, Carduus nutans, Lactuca serriola, Sonchus oleraceus, Sonchus aspen, Wedelia glauca, Melampodium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis, Soliva sessilis*; Liliaceae weeds: *Allium canadense, Allium vineale*; Commelinaceae weeds: *Cyanotis axillaris, Commelina communis, Commelina benghalensis, Commelina erecta*; Poaceae weeds: *Dinebra retroflexa, Cynodon dactylon, Echinochloa colonum, Echinochloa crusgalli, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Alospecurus aequalis, Alopecurus myosuroides, Avena fatua, Sorghum halepense, Sorghum vulgare, Agropyron repens, Lolium multiflorum, Lolium perenne, Lolium rigidum, Bromus secalinus, Bromus tectorum, Hordeum jubatum, Aegilops cylindrica, Phalaris arundinacea, Phalaris minor, Apera spicaventi, Panicum dichotomiflorum, Panicum texanum, Panicum maximum, Brachiaria reptains Brachiaria platyphylla, Brachiaria ruziziensis, Brachiaria plantaginea, Brachiaria decumbens, Brachiaria brizantha, Brachiaria humidicola, Brachiaria mutica, Cenchrus echinatus, Cenchrus pauciflorus, Eriochloa villosa, Pennisetum setosum, Chloris gayana, Chloris barbata, Eragrostis pilosa, Rhynchelitrum repens, Dactyloctenium aegyptium, Ischaemum rugosum, Oryza sativa, Paspalum notatum, Paspalum maritimum, Pennisetum clandestinum, Pennisetum setosum, Rottboellia cochinchinensis*; Cyperaceae weeds: *Cyperus microiria, Cyperus iria, Cyperus odoratus, Cyperus rotundus, Cyperus esculentus, Kyllinga gracillima*, Equisetaceae weeds: *Equisetum arvense, Equisetum palustre*, Trianthema weeds and the like.

The combination according to the present invention is effective for the following plant diseases: Disease in rice: Blast (*Magnaporthe grisea*), *Helminthosporium* leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases of barley: powdery mildew (*Erysiphe graminis*), *Fusarium* head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and *Rhizoctonia* damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*) and *Rhizoctonia* damping-off (*Rhizoctonia solani*).

Diseases of citrus: melanose (*Diaporthe cirri*), scab (*Elsinoe fawcetti*), *penicillium* rot (*Penicillium digitatum, P. italicum*), and brown rot (*Phytophthora parasitica, Phytophthora citrophthora*).

Diseases of apple: blossom blight (*Monilinia mali*), canker (*Valsa ceratosperma*), powdery mildew (*Podosphaera leucotricha*), *Alternaria* leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*). Diseases of pear: scab (*Ven-*

*turia nashicola, V. pirina*), powdery mildew, black spot (*Alternaria alternata* Japanese pear pathotype), rust (*Gymnosporangium haraeanum*), and *phytophthora* fruit rot (*Phytophtora cactorum*).

Diseases of peach: brown rot (*Monilinia fructicola*), powdery mildew, scab (*Cladosporium carpophilum*), and *phomopsis* rot (*Phomopsis* sp.).

Diseases of grape: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), *botrytis*, and downy mildew (*Plasmopara* viticola).

Diseases of Japanese persimmon: anthracnose (*Gloeosporium kaki*), and leaf spot (*Cercospora* kaki, *Mycosphaerella nawae*).

Diseases of gourd: anthracnose (*Colletotrichum lagenarium*), powdery mildew (*Sphaerotheca fuliginea*), gummy stem blight (*Mycosphaerella melonis*), *Fusarium* wilt (*Fusarium oxysporum*), downy mildew (*Pseudoperonospora cubensis*), *Phytophthora* rot (*Phytophthora* sp.), and damping-off (*Pythium* sp).

Diseases of tomato: early blight (*Alternaria solani*), leaf mold (*Cladosporium fulvum*), and late blight (*Phytophthora infestans*).

Diseases of eggplant: brown spot (*Phomopsis vexans*), and powdery mildew (*Erysiphe cichoracearum*) Diseases of cruciferous vegetables: *Alternaria* leaf spot (*Alternaria japonica*), white spot (*Cercosporella brassicae*), clubroot (*Plasmodiophora brassicae*), and downy mildew (*Peronospora parasitica*).

Diseases of onion: rust (*Puccinia allii*), and downy mildew (*Peronospora destructor*).

Diseases of soybean: purple seed stain (*Cercospora kikuchii*), sphaceloma scad (*Elsinoe glycines*), pod and stem blight (*Diaporthe phaseolorum* var. *sojae*), *septoria* brown spot (*Septoria glycines*), frogeye leaf spot (*Cercospora sojina*), rust (*Phakopsora pachyrhizi*), Yellow rust, brown stem rot (*Phytophthora sojae*), and *Rhizoctonia* damping-off (*Rhizoctonia solani*).

Diseases of kidney bean: anthracnose (*Colletotrichum lindemthianum*). Diseases of peanut: leaf spot (*Cercospora personata*), brown leaf spot (*Cercospora arachidicola*) and southern blight (*Sclerotium rolfsii*).

Diseases of garden pea: powdery mildew (*Erysiphe pisi*), and root rot (*Fusarium solani* f. sp. *pisi*).

Diseases of potato: early blight (*Alternaria solani*), late blight (*Phytophthora infestans*), pink rot (*Phytophthora erythroseptica*), and powdery scab (*Spongospora subterranean* f. sp. *subterranea*). Diseases of strawberry: powdery mildew (*Sphaerotheca humuli*), and anthracnose (*Glomerella cingulata*).

Diseases of tea: net blister blight (*Exobasidium reticulatum*), white scab (*Elsinoe leucospila*), gray blight (*Pestalotiopsis* sp.), and anthracnose (*Colletotrichum theae-sinensis*).

Diseases of tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed: sclerotinia rot (*Sclerotinia sclerotiorum*), and *Rhizoctonia* damping-off (*Rhizoctonia solani*). Diseases of cotton: Rhizoctonia damping-off (*Rhizoctonia solani*). Diseases of sugar beat: *Cercospora* leaf spot (*Cercospora beticola*), leaf blight (*Thanatephorus cucumeris*), Root rot (*Thanatephorus cucumeris*), and *Aphanomyces* root rot (*Aphanomyces cochlioides*). Diseases of rose: black spot (*Diplocarpon rosae*), powdery mildew (*Sphaerotheca pannosa*), and downy mildew (*Peronospora sparsa*). Diseases of *chrysanthemum* and asteraceous plants: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulare, Pythium ultimum*), gray mold. (*Botrytis cinerea*), and *Sclerotinia* rot (*Sclerotinia sclerotiorum*).

Disease of Japanese radish: *Alternaria* leaf spot (*Alternaria brassicicola*).

Diseases of turfgrass: dollar spot (*Sclerotinia homeocarpa*), and brown patch and large patch (*Rhizoctonia solani*).

Disease of banana: Black sigatoka (*Mycosphaerella fijiensis*), Yellow sigatoka (*Mycosphaerella musicola*).

Disease of sunflower: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants mediated by *Polymixa* spp. or *Olpidium* spp. and so on.

The combination of the present invention can be used in agricultural lands such as fields, paddy fields, lawns and orchards or in non-agricultural lands. The present invention may be used to control diseases in agricultural lands for cultivating the plants without any phytotoxicity to the plant. Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, Colocasia*, etc., flowers, foliage plants, turf grasses, fruits: pome fruits such apple, pear, quince, etc, stone fleshy fruits such as peach, plum, nectarine, *Prunus* mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *Zelkova*, Japanese arborvitae, fir wood, hemlock, juniper, *Pinus, Picea*, and *Taxus* cuspidate, etc.

In an embodiment, the combinations of the present invention may be applied to the locus either simultaneously or sequentially, such that triacontanol, herbicide or fungicide may be applied in a tank mix or as a pre-mixed composition. In an embodiment, the present invention may be applied either pre or post emergent. The advantage of the combination is surprisingly good residual effects, when applied in pre-emergent as well as quick knockdown when applied post emergent leading to quick control of weeds.

In another embodiment, the present invention may be applied for quick burndown of weeds. Another advantage is quick knockdown in the case of burndown.

The method of control of the present invention may be carried out by spraying the suggested tank mixes, or the individual active constituent may be formulated as a kit-of-parts containing various components that may be mixed as instructed prior to spraying.

In an embodiment, the components of the present invention may be packaged such that triacontanol, the herbicide or the fungicide may be packaged separately and then tank mixed before the spraying.

In another embodiment, the components of the present invention may be packaged such that triacontanol, the herbicide or the fungicide may be packaged separately, whereas other additives are packaged separately, such that the two maybe tank mixed at the time of spraying. In another embodiment, the components of the present invention may be packaged as composition such that triacontanol, the herbicide or the fungicide are formulated into one composition and other additives are packaged separately, such that the two maybe tank mixed at the time of spraying.

Thus, in an embodiment, the present invention provides a kit-of-parts comprising (a) a component of triacontanol or its derivatives; and (b) a component of an herbicide or a fungicide.

Surprisingly, it has been found by the present inventors, that herbicide or fungicide of the present invention, when applied individually, and even if ineffective or insufficient in controlling weeds or fungal infestation in isolation but demonstrated excellent synergistic control when applied together with triacontanol. The combination controlled the weed or fungal infestation completely. The present method also provides a broader spectrum of controlling weeds or fungal infestation that helps in resistance management, thus preventing the weed or fungal infestation from becoming resistant to the herbicide or fungicide whilst providing a broader spectrum of control at lower use rates.

The invention will now be explained in more detail in the following examples that illustrate, but are not intended to limit, the invention. The invention shall now be described with reference to the following specific examples. It should be noted that the example(s) appended below illustrate rather than limit the invention, and that those skilled in the art will be able to design many alternative embodiments without departing from the scope of the present invention.

EXAMPLES

Synergy Studies

Field trials were carried out to test the synergy of the combination Glufosinate and Triacontanol. The field trials were carried out at Murari, A.P. The percentage efficacy was calculated after 15, 25 and 30 days of applications. The application was in the open space among the plants in a *Papaya* orchard and the results are recorded in the table below:—

| | | Weed—PANRP | |
|---|---|---|---|
| Dose Active | Dose rate ml/ha | % Weed control at 15 DAA | % Weed control at 25 DAA |
| Untreated check | | [300] | [350] |
| Glufosinate | 3000 | 85 | 65 |
| Glufosinate + Triacontanol | 3000 + 500 | 100 | 99 |

In an embodiment, the present invention provides a combination that administers 3000 mL/ha of glufosinate and 500 mL/ha of triacontanol to a field.

PANRP—*Brachiaria reptans*

| Dose | Dose rate | % Weed control at 30 DAA | | | | | | | | |
|---|---|---|---|---|---|---|---|---|---|---|
| Active | ml/ha | TRTPO | COMBE | AMASP | PTNHY | 1CRGG | DIMRE | CYNDH | CYPRO | EPHHL |
| Untreated check | | [42.2] | [44.4] | [36.7] | [55] | [22.4] | [18.9] | [37.8] | [18.8] | [14.8] |
| Glufosinate | 3000 | 81 | 47 | 73 | 96 | 69 | 62 | 54 | 11 | 80 |
| Glufosinate + Triacontanol | 3000 + 500 | 99 | 75 | 100 | 100 | 84 | 82 | 66 | 42 | 100 |

Data in parenthesis is actual mean weeds count

TRTPO—*Trianthema portulacastrum*, COMBE—*Commelina benghalensis*, AMASP—*Amaranthus spinosus*, PTNHY—*Parthenium hysterophorus,* 1CRGG—*Corchorus*, DIMRE—*Dinebra retroflexa*, CYNDH—*Cynodon dactylon*, CYPRO—*Cyperus rotundus*, EPHHL—*Euphorbia heterophylla*

Conclusion:—The difference in results between Glufosinate standalone and combination with Triacontanol were unexpected. The combination of Glufosinate with Triacontanol treatment showed excellent control and complete killing of the weeds as compared to standalone Glufosinate treatments.

Additionally, when observed after 25 days of application, the plot with Triacontanol was showing complete kill of weeds compared to standalone plots (FIG. 3). The kill was completely elaborate in terms of visual kill of weeds in Triacontanol mixture treatments when compared to standalone Glufosinate treatments.

It was surprisingly observed that the Triacontanol was found to be unexpectedly useful in complete killing of weeds or inhibiting fungi in plants when combined with herbicides or fungicides at lower dosage rates.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A combination consisting of:

a. triacontanol or its derivatives; and b. glufosinate.

2. The combination as claimed in claim 1, wherein the said glufosinate is selected from the group consisting of glufosinate, L-glufosinate, and glufosinate-P.

3. The combination as claimed in claim 1, wherein the triacontanol or its derivatives and the glufosinate are admixed in a ratio of (1 to 10):(1000 to 20000).

4. The combination as claimed in claim 1, wherein the said glufosinate is selected from glufosinate and L-glufosinate.

5. A method of controlling weeds or fungal infestation at a locus, the method comprising applying, to the locus, a combination or a composition consisting of:

a. triacontanol or its derivatives; and b. glufosinate.

6. A method of increasing yield in a crop the method comprising applying, to a locus of the crop, a combination or a composition consisting of:

a. triacontanol or its derivatives; and b. glufosinate.

7. A method of improving the plant health, said method comprising application at the locus of the plant, the combination as claimed in claim 1.

8. A kit-of-parts consisting of:

a. a component of triacontanol or its derivatives; and b. a component of glufosinate.

* * * * *